United States Patent Office 3,586,716
Patented June 22, 1971

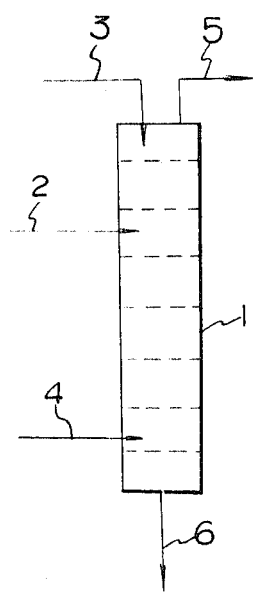

3,586,716
PROCESS FOR CONTINUOUS HYDROLYSIS OF GLYCOL ESTER
Teruo Yasui, Masuhiko Tamura, and Mitsutoshi Tsutsumi, Kurashiki, Japan, assignors to Kurashiki Rayon Co., Ltd., Kurashiki, Japan
Filed Nov. 20, 1968, Ser. No. 777,333
Claims priority, application Japan, Nov. 25, 1967, 42/75,819
Int. Cl. C07c 53/02, 53/08, 53/22
U.S. Cl. 260—541
8 Claims

ABSTRACT OF THE DISCLOSURE

Process for the hydrolysis of an ester of lower alkylene glycol and lower aliphatic carboxylic acid in a continuous system which comprises reacting a mixture of ester, water, and acid catalyst continuously fed from the upper part of a column reactor with a countercurrent lower alkyl ether continuously fed from the lower part of the reactor as an extracting agent and continuously removing the ether containing generated lower aliphatic carboxylic acid from the top of the reactor and the water containing generated lower alkylene glycol from the bottom of the reactor.

---

This invention relates to a process for continuously hydrolyzing esters of lower alkylene glycols and lower aliphatic carboxylic acids. By this process, lower aliphatic carboxylic acids and inter alia valuable lower alkylene glycols, hydrolysis products of the esters, can be readily obtained.

Recently there have been developed processes for manufacturing, with a high yield, a monester of alkylene glycol and carboxylic acid product which contains a small amount of diester, by reacting corresponding olefine or olefine and oxygen with carboxylic acid in the presence of specified catalysts. It is industrially significant to efficiently obtain valuable alkylene glycols from cheap esters thus manufactured because alkylene glycols, hitherto have been manufactured industrially by the reaction of alkylene oxides with water and the costs of their production are relatively high.

The hydrolysis reaction of ester is per se well known in the art, but a commercially advantageous process of continuous hydrolysis of an ester of lower alkylene glycol and lower aliphatic carboxylic acid has not yet been taught nor practiced.

Hence, the object of this invention is to provide a continuous process for conducting a commercially advantageous hydrolysis reaction to obtain lower alkylene glycol from an ester of lower alkylene glycol and lower aliphatic carboxylic acid. Other objects and advantages of this invention will be clear by the following description.

Fundamentally, this invention is based on the discovery that when an ester of lower alkylene glycol and lower aliphatic carboxylic acid is hydrolyzed in an aqueous phase in the presence of an acid catalyst, the progress of the reaction can smoothly be accelerated by extracting carboxylic acid, one component of hydrolysis products, with an ether and driving it off outside the system during its generation. It has never been disclosed hitherto that when an ether is made to coexist with raw materials and products in the ester hydrolysis reaction, namely, ester, water, catalyst, glycol and carboxylic acid, the distribution coefficient of each substance other than ether and water has a favorable feature in accelerating hydrolysis reaction. Among others, ethers have very advantageous properties such as good chemical stability, ease of separation and recovery by distillation, easy care of handling, relatively low price and so forth, in using them as extracting agent of carboxylic acid in hydrolysis reaction.

The continuous hydrolysis process for an ester of lower alkylene glycol and lower aliphatic carboxylic acid of this invention is described below. An ester of lower alkylene glycol and lower aliphatic carboxylic acid, water and acid catalyst are continuously fed to a column reactor from the upper part of said reactor and lower alkyl ether from the lower part respectively. These feed materials fed into the reactor from the upper and lower parts of said reactor run countercurrently at reaction temperatures of 60 to 150° C., under pressure enough to maintain said ether in the liquid state at an applied reaction temperature. Then, the ether containing the generated lower aliphatic carboxylic acid is continuously removed from the top of said reactor and the water containing the generated lower alkylene glycol from the bottom. At this time, the amount of water to be fed is 1 to 10 mols per mol equivalent of ester bond in the ester, the amount of acid catalyst to be fed 0.01 to 1 mol per liter of the total amount of feed materials fed from the upper part of the reactor, and the amount of ether to be fed 1 to 15 mols per mol equivalent of ester bond in the ester.

The process of the present invention will be explained more fully below. In this specification and the claims, "lower alkylene glycols" means alkylene glycols containing 2 to 4 carbon atoms, which include ethylene glycol, propylene glycol and butylene glycols, and "lower aliphatic carboxylic acid" means aliphatic carboxylic acids containing 1 to 4 carbon atoms, which include formic acid, acetic acid, propionic acid and butyric acid. Hence, an ester of lower alkylene glycol and lower aliphatic carboxylic acid is a mono- or di-ester of any of said alkylene glycols with any of said aliphatic carboxylic acids. As starting materials of this invention, said mono-ester, said di-ester and the mixture thereof may be used.

Lower alkyl ether used as an extracting agent in this invention is one containing 4 to 8 carbon atoms per molecule, such as diethyl ether, dipropyl ethers, dibutyl ethers, ethyl propyl ethers, ethylbutyl ethers and propylbutyl ethers. These ethers are chemically stable under hydrolysis reaction conditions and immiscible with water. And it was found that in the hydrolysis reaction system, the solubility of raw material ester and product glycol in the ether is respectively low, but the solubility of generated carboxylic acid in the ether is high. Thus, the ether acts as an extracting agent for carboxylic acid, and increases the rate of reaction by decreasing the concentration of carboxylic acid in the reaction system. Therefore, the presence of ether makes possible an advantageous hydrolysis reaction by use of a small amount of water. Any of the above-mentioned ethers are usable and can be optionally selected depending upon the types of raw material, reaction condition, etc. For instance, when ethylene glycol acetate is hydrolyzed, diisopropyl ether is most preferably used in view of its boiling point favorable to operations and the high distribution coefficient of generated acetic acid to said diisopropyl ether.

An acid catalyst to be used in this invention is one which is commonly used in ester hydrolysis. Among such acids are included sulfuric acid, hydrochloric acid, nitric acid, chloric acid, benzenesulfonic acid, paratoluenesulfonic acid and cation exchange resin. Generally, sulfuric acid is most preferably used.

The amounts of materials to be used in this invention are discussed below.

According to the process of this invention, satisfactorily high hydrolysis yields of 90% or above are obtainable by using a relatively small amount of water, i.e. 1 to 10 mols, but preferably 2 to 7 mols per mol equivalent of ester bond in the raw material ester. For example, as shown in Example 1 (discussed later), a hydrolysis yield of ethylene glycol monoacetate easily reaches 95% by use of about 5.8 mols of water per mol equivalent of ester bond in the ethylene glycol monoacetate. On the other hand, a hydrolysis yield reaches only about 65% when the same ester is hydrolyzed with 5.8 mols of water per mol equivalent of ester bond in the ethylene glycol monoacetate without using ether and as great as 73 mols of water per mol equivalent of ester bond in the ethylene glycol monoacetate is needed to obtain a hydrolysis yield of 95%. In the present invention, because of the low requirement of water as mentioned above, it will suffice to use a compact reactor, less amount of heat for reaction, and the separation and recovery of a product glycol from water can be very advantageously carried out.

The amount of ether to be used in this invention is 1 to 15 mols, preferably 2 to 10 mols per mol equivalent of ester bond in the raw material ester. Very satisfactory results can be obtained by using the said amount of ether and the desired object of this invention can be accomplished. Too small amounts of ether do not give the desired effect. Excess amounts, on the contrary, impedes the progress of reaction because the amount of raw material ester dissolving in ether becomes greater. The ether within the above-mentioned range fully displays its function by the continuous process by means of a column reactor in this invention. If a batch reaction is conducted without using a column reactor, as great as about 40 mols of ether per mol equivalent of ester bond in the raw material ester has to be employed to obtain the same desired result.

The amount of acid catalyst to be used, which is that of conventional catalyst, is 0.01 to 1 mol per liter of the total amount of the raw material ester and water. With an acid concentration of less than 0.01 mol per liter, the desired rate of reaction can not be obtained, and an acid concentration of more than 1 mol per liter causes the corrosion of the reactor and generates unfavorable side reactions such as dehydration reaction.

Reaction temperatures to be used in the process of this invention are 60 to 150° C., preferably 70 to 110° C. Pressure to be used should be enough to maintain the used ether in the liquid phase at the applied reaction temperature and it is generally 15 atm. or below. With too low reaction temperatures, the rate of reaction for practical use can not be obtained and temperatures higher than 150° C. increase side reactions, such as dehydration and is disadvantageous in that a relatively high pressure is required to maintain the used ether in the liquid phase.

A column reactor to be used may be any one which is commonly used as extraction column such as packed columns, multi-stage columns, any other types of columns. In this invention a multi-stage perforated plate column is preferably used.

The process of this invention will be described below with reference to the accompanying drawing. It is to be understood that the following description is for better understanding and that various changes and modifications can be made by one skilled in the art without departing from the scope and spirit of the invention.

The accompanying drawing schematically shows one embodiment of a column reactor suitable for the practice of the present invention.

Raw material ester is continuously fed into reactor 1 from Line 2 located at the upper part of said reactor. Reactor 1 shown in the drawing is a multi-stage perforated plate tower. Water and an acid catalyst are fed from Line 3 higher than Line 2, but a part or whole of water and acid catalyst may be fed from Line 2 by mixing it with ester. Most preferably, at least a part of water or acid is fed from Line 3. The liquid mixture of ester, water and acid catalyst is maintained at a predetermined temperature and, while flowing down in the column, the ester is hydrolyzed. On the other hand, ether is continuously introduced into the lower part of the column from Line 4. Ether runs upwards through the column, while coming into contact with the liquid mixture flowing down from said upper part of the column, on account of different specific gravity of the two. During the time, ether extracts carboxylic acid generated by hydrolysis. The perforated plates assist in a close contact of ether with the liquid mixture. For obtaining better contact between them, a means such as a pulsator may be installed at the lower part of the column. The ether containing generated carboxylic acid is discharged from Line 5 at or near the top of the column and the aqueous phase containing generated glycol is continuously recovered from Line 6 installed at the bottom of the column. The residence time of feed materials in the column can easily be calculated by the reaction velocity depending upon the applied reaction conditions. As mentioned above, continuous hydrolysis reaction of this invention is conducted very smoothly and with a high yield.

Although small amounts of glycol and unreacted ester besides carboxylic acid are contained in the ether phase discharged from Line 5, it is possible to separate the ether phase into each component by an appropriate separation process for recovery or recycling use. The aqueous phase from Line 6 contains most of the generated glycol, a small amount of unreacted ester, a small amount of carboxylic acid, and acid catalyst. The preparation of pure glycol is achieved by adding to the aqueous phase a stoichiometric amount of caustic alkali sufficient enough to decompose ester present in said aqueous phase and to neutralize carboxylic acid and acid catalyst, and then subjecting it to such a separation means as distillation.

The following will describe the examples of the present invention, in which all the amounts are based on those flowing per hour.

EXAMPLE 1

A reactor to be used was one which is shown in the accompanying drawing. The reactor was a perforated plate column 20 cm. in diameter with 20 perforated plates having a number of holes, 1 mm. in diameter, installed at 20 cm. intervals. On the fifth stage from the top was installed a raw material feeding part (Line 2) and on the second stage from the bottom on either entrance (Line 4). Further, on the fourth stage from the bottom was installed a pulsator with a piston having a capacity of 10 cc. and 200 times per minute (not shown in the drawing).

The reaction was conducted at column inner temperature of 80 to 90° C. under 2 atm. From Line 2 were introduced 40 kg. of ethylene glycol monoacetate and 10 kg. of water, and from Line 4, 80 kg. of diisopropyl ether, and from Line 3, 30 kg. of water and 1.0 kg. of sulfuric acid. As a result of the reaction, 21.7 kg. of acetic acid, 1.5 kg. of water, 2 kg. of ethylene glycol monoacetate and 79 kg. of diisopropyl ether were obtained from Line 5 of the column top. From Line 6 at the bottom were obtained 22.6 kg. of ethylene glycol, 32.0 kg. of water, 1 kg. of diisopropyl ether and 1.0 kg. of sulfuric acid. The yield of ethylene glycol (hydrolysis percentage) is 95%.

EXAMPLE 2

With the same reactor and reaction conditions as in Example 1, a mixture of 31.2 kg. of ethylene glycol monoacetate, 3.7 kg. of ethylene glycol diacetate, 3.3 kg. of ethylene glycol, and 0.1 kg. of acetic acid was introduced into the column together with 5 kg. of water from Line 2. From Line 3 were introduced 40 kg. of water and 1.0 kg. of sulfuric acid and from Line 4, 85 kg. of diisopropyl ether. As a result, from Line 5 were obtained 19.0 kg. of acetic acid, 1.5 kg. of water, 2.5 kg. of ethylene glycol monoacetate and 84 kg. of diisopropyl ether and from Line 6, 22.6 kg. of ethylene glycol, 37.0 kg. of water, 1 kg. of diisopropyl ether, and 1 kg. of sulfuric acid.

EXAMPLE 3

The same reactor as in Example 1 was used. The reaction was conducted at a column inner temperature of 100° C. under atmospheric pressure. From Line 2 was introduced 50 kg. of raw material propylene glycol monoacetate, from Line 3, 65 kg. of water and 1.5 kg. of sulfuric acid were fed, and 115 kg. of di-n-butyl ether was fed from Line 4. As a result of the reaction, from Line 5 were obtained 19 kg. of acetic acid, 0.5 kg. of water, 2.5 kg. of propylene glycol monoacetate and 115 kg. of di-n-butyl ether and from Line 6, 26.7 kg. of propylene glycol, 58 kg. of water and 1.5 kg. of sulfuric acid.

EXAMPLE 4

The same reactor and reaction conditions as in Example 1 were used. As raw materials, a mixture of 31.2 kg. of ethylene glyocl monoacetate, 3.7 kg. of ethylene glycol diacetate, 3.3 kg. of ethylene glycol and 0.1 kg. of acetic acid and 7 kg. of water were introduced into the column from Line 2, 40 kg. of water and 1.0 kg. of sulfuric acid from Line 3, and from Line 4 was introduced 80 kg. of ethyl isopropyl ether.

As a result of the reaction, from Line 6, was obtained a mixture of 22.6 kg. of ethylene glycol, 35 kg. of water, 1 kg. of ethyl isopropyl ether and 1 kg. of sulfuric acid. In this case the hydrolysis percentage of glycol ester is 95.7%.

EXAMPLE 5

The same reactor and reaction conditions were used as in Example 1. From Line 2 was introduced into the column a mixture of 30 kg. of 1,2-butylene glycol monopropionate, 4 kg. of 1,2-butylene glycol dipropionate and 10 kg. of water, from Line 3, 40 kg. of water and 1.0 kg. of sulfuric acid, and from Line 4, 75 kg. of diisopropyl ether.

As a result, from Line 6 was obtained a mixture of 18.7 kg. of 1,2-butylene glycol, 40 kg. of water, 1.5 kg. of diisopropyl ether, and 1 kg. of sulfuric acid.

What is claimed is:

1. A process for hydrolyzing an ester of lower alkylene glycol and lower aliphatic carboxylic acid in a continuous system which comprises continuously feeding said ester, water and an acid catalyst into a column reactor from the upper part of said reactor and a lower alkyl ether from the lower part of said reactor, making feed materials from the upper and lower parts of said reactor flow countercurrent at reaction temperatures of 60 to 150° C. under pressure sufficient to maintain said ether in liquid state at the applied reaction temperature, and continuously removing the ether containing the lower aliphatic carboxylic acid from the top of said reactor and water containing the generated lower alkylene glycol from the bottom of said reactor, the amount of water to be fed being 1 to 10 mols per mol equivalent of ester bond in the ester, the amount of the acid catalyst to be fed being 0.01 to 1 mol per liter of the total amount of feed materials from the upper part of said reactor and the amount of the ether to be fed being 1 to 15 mols per mol equivalent of ester bond in the ester.

2. The process according to claim 1 wherein the amount of water to be fed is 2 to 7 mols per mol equivalent of ester bond in the ester.

3. The process according to claim 1 wherein the amount of ether to be fed is 2 to 10 mols per mol equivalent of ester bond in the ester.

4. The process according to claim 1 wherein reaction temperatures are 70 to 110° C.

5. The process according to claim 1 wherein the ester is ethylene glycol monoacetate.

6. The process according to claim 1 wherein the ester is propylene glycol monoacetate.

7. The process according to claim 1 wherein the ester is ethylene glycol monoacetate and the ether is diisopropyl ether.

8. The process according to claim 1 wherein the ester is propylene glycol monoacetate and the ether is di-n-butyl ether.

References Cited

UNITED STATES PATENTS

| | | | |
|---|---|---|---|
| 2,650,249 | 8/1953 | Montion et al. | 260—541 |
| 2,651,604 | 9/1953 | Hartley | 260—541 |
| 2,651,605 | 9/1953 | Hartley et al. | 260—541 |
| 2,936,321 | 5/1960 | Mercier | 260—541 |

LORRAINE A. WEINBERGER, Primary Examiner

V. GARNER, Assistant Examiner

U.S. Cl. X.R.

260—540, 542, 635, 637